(12) United States Patent
Steiner et al.

(10) Patent No.: US 10,457,343 B2
(45) Date of Patent: Oct. 29, 2019

(54) TRACK CHAIN ASSEMBLY OF UNDERCARRIAGE WITH LINK HAVING INCREASED PITCH

(71) Applicant: Caterpillar Inc., Peoria, IL (US)

(72) Inventors: Kevin L. Steiner, Tremont, IL (US); Donovan S. Clarke, East Peoria, IL (US); Kevin D. Eccles, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 112 days.

(21) Appl. No.: 15/701,554

(22) Filed: Sep. 12, 2017

(65) Prior Publication Data

US 2018/0099709 A1    Apr. 12, 2018

Related U.S. Application Data

(60) Provisional application No. 62/405,702, filed on Oct. 7, 2016.

(51) Int. Cl.
*B62D 55/21* (2006.01)
*B62D 55/32* (2006.01)

(52) U.S. Cl.
CPC .......... *B62D 55/213* (2013.01); *B62D 55/21* (2013.01); *B62D 55/32* (2013.01)

(58) Field of Classification Search
CPC ....... B62D 55/21; B62D 55/213; B62D 55/32
USPC ...................................................... 305/186
See application file for complete search history.

(56) References Cited

U.S. PATENT DOCUMENTS

| | | | |
|---|---|---|---|
| 3,712,687 A * | 1/1973 | Alexander | B62D 55/20 152/185.1 |
| 5,700,384 A | 12/1997 | Marchand et al. | |
| 6,412,887 B1 * | 7/2002 | Ketting | B62D 55/213 305/186 |
| 6,442,887 B2 * | 9/2002 | Sanquist | A01K 97/05 43/55 |
| 6,739,680 B2 | 5/2004 | Hasselbusch et al. | |
| 7,877,977 B2 | 2/2011 | Johannsen et al. | |
| 9,045,180 B2 | 6/2015 | Brewer et al. | |
| 2008/0174175 A1 * | 7/2008 | Livesay | B62D 55/213 305/186 |
| 2011/0316331 A1 | 12/2011 | Clarke et al. | |
| 2016/0176456 A1 | 6/2016 | Oertley | |

* cited by examiner

*Primary Examiner* — S. Joseph Morano
*Assistant Examiner* — Jean W Charleston
(74) *Attorney, Agent, or Firm* — Leydig, Voit & Mayer, LTD.

(57) ABSTRACT

A track chain assembly includes a track pin, a first link, and a second link. The first link defines a first pair of pin passages in spaced relationship to each other by a first link pitch. The first link is mounted to the track pin such that the track pin extends through one of the first pair of pin passages. The second link defines a second pair of pin passages in spaced relationship to each other by a second link pitch. The second link is mounted to the track pin such that the track pin extends through one of the second pair of pin passages and such that the first link and the second link are rotatable with respect to each other about a longitudinal axis defined by the track pin. The second link pitch is greater than the first link pitch in a range up to twice the first link pitch.

17 Claims, 5 Drawing Sheets

TRACK CHAIN ASSEMBLY OF UNDERCARRIAGE WITH LINK HAVING INCREASED PITCH

CROSS-RELATED TO RELATED APPLICATION

This application claims the benefit of U.S. Provisional Patent Application No. 62/405,702, filed Oct. 7, 2016, which is hereby incorporating by reference in its entirety.

TECHNICAL FIELD

This patent disclosure relates generally to a track chain assembly for a track-type machine and, more particularly, to a link for use in a track chain assembly of the machine.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example.

Typical track chain assembly designs include a track pin either fixedly or rotatably connected to a pair of chain links and a bushing rotatably positioned between the links and about the track pin. Such track chain assemblies can operate in extremely adverse environments in which track joints may be exposed to various abrasive mixtures of water, dirt, sand, rock or other mineral or chemical elements.

It is desirable to design track chain assemblies such that they can be disassembled for servicing or repair or for replacement. A "master link" can be provided in the series of links comprising the track chain assembly which is configured for this purpose, and a great many different master link designs have been developed over the years.

In one common class of master link designs, one or more teeth are provided on separate link portions which can be mated together such that the teeth interlock with one another. Fasteners such as dowels, bolts, etc. may be used to secure the respective link portions together, and the master link can be positioned in a machine track where it operates in a manner similar to the other standard links. When it is desirable to disassemble the links (e.g. for repair, servicing, shipping, etc.), the fasteners coupling the link portions of the master link together are removed, thereby allowing the track chain assembly to be disassembled by separating the link portions. While the two-part master link approach has proven to be quite useful, the ruggedness of many environments within which tracked machines operate can mandate specialized features for master links, as well as place a premium on durability and service life.

U.S. Patent Application Publication No. US2008/0174175 is entitled, "Master Link for Machine Track and Method," and is directed to a master link for a track of a machine that includes a first link member having a profiled surface with a sinusoidal segment defined by a tooth and an adjacent recess. The master link further includes a second link member configured complementarily to the first link member, their respective profiled surfaces together defining a mating interface for transmitting loads therebetween. A machine further includes a track having a single tooth master link wherein profiled surfaces on adjacent link members together define a mating interface for transmitting loads through the track, each of the profiled surfaces having a sinusoidal segment.

There is a continued need in the art to provide additional solutions for a track chain assembly. For example, there is a continued need for a track chain assembly which is readily assembled and mounted to a sprocket of the undercarriage which can maintain adequate engagement therewith over an extended useful life of the track chain assembly.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a track chain assembly for an undercarriage of a machine. In addition, the present disclosure, in another aspect, is directed to embodiments of a machine including a track chain assembly.

In an embodiment, a track chain assembly includes a track pin, a first link, and a second link. The track pin defines a longitudinal axis. The first link defines a first pair of pin passages in spaced relationship to each other by a first link pitch. The first link is mounted to the track pin such that the track pin extends through one of the first pair of pin passages. The second link defines a second pair of pin passages in spaced relationship to each other by a second link pitch. The second link is mounted to the track pin such that the track pin extends through one of the second pair of pin passages and such that the first link and the second link are rotatable with respect to each other about the longitudinal axis of the track pin. The second link pitch is greater than the first link pitch in a range up to twice the first link pitch.

In another embodiment, a track chain assembly includes a plurality of link subassemblies and a master link subassembly. Each of the plurality of link subassemblies is connected to an adjacent link subassembly such that the plurality of link subassemblies has a first end and a second end. The master link subassembly is connected to the first end and the second end of the plurality of link subassemblies.

Each of the plurality of link subassemblies includes a link. The link defines a pair of pin passages in spaced relationship to each other by a standard link pitch. The master link subassembly includes a master link. The master link defines a pair of master link pin passages in spaced relationship to each other by a master link pitch. The master link pitch is greater than the standard link pitch in a range up to twice the standard link pitch.

In yet another embodiment, a machine includes a frame, a drive sprocket, and a track chain assembly. The drive sprocket is rotatably mounted with respect to the frame. The track chain assembly is enmeshed with the drive sprocket.

The track chain assembly includes a plurality of link subassemblies and a master link subassembly. Each of the plurality of link subassemblies is connected to an adjacent link subassembly such that the plurality of link subassemblies has a first end and a second end. The master link subassembly is connected to the first end and the second end of the plurality of link subassemblies.

Each of the plurality of link subassemblies includes a link. The link defines a pair of pin passages in spaced relationship to each other by a standard link pitch. The master link subassembly includes a master link. The master link defines a pair of master link pin passages in spaced relationship to each other by a master link pitch. The master link pitch is greater than the standard link pitch in a range up to twice the standard link pitch.

Further and alternative aspects and features of the disclosed principles will be appreciated from the following detailed description and the accompanying drawings. As will be appreciated, the principles related to master links, track chain assemblies, and machines, disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides a link for a track chain assembly of an undercarriage of a track-type machine. Examples of track-type machines include machines used for construction, mining, forestry, and other similar industries. In some embodiments, the machine can be a dozer, loader, excavator, or any other on-highway or off-highway vehicle having a track-type undercarriage. The undercarriage can include track chain assemblies adapted to engage the ground, or other surface, to propel the track-type machine.

In embodiments, a link constructed according to principles of the present disclosure can define a first pin passage and a second pin passage that are adapted to receive a respective track pin therethrough. The first pin passage and the second pin passage of the link can have an increased link pitch (i.e., the longitudinal distance between the first pin passage and the second pin passage) that is greater than a standard link pitch of a plurality of other links comprising the track chain assembly. In embodiments, the link having an increased link pitch relative to other links of the track chain assembly can comprise a master link.

Figure 1:
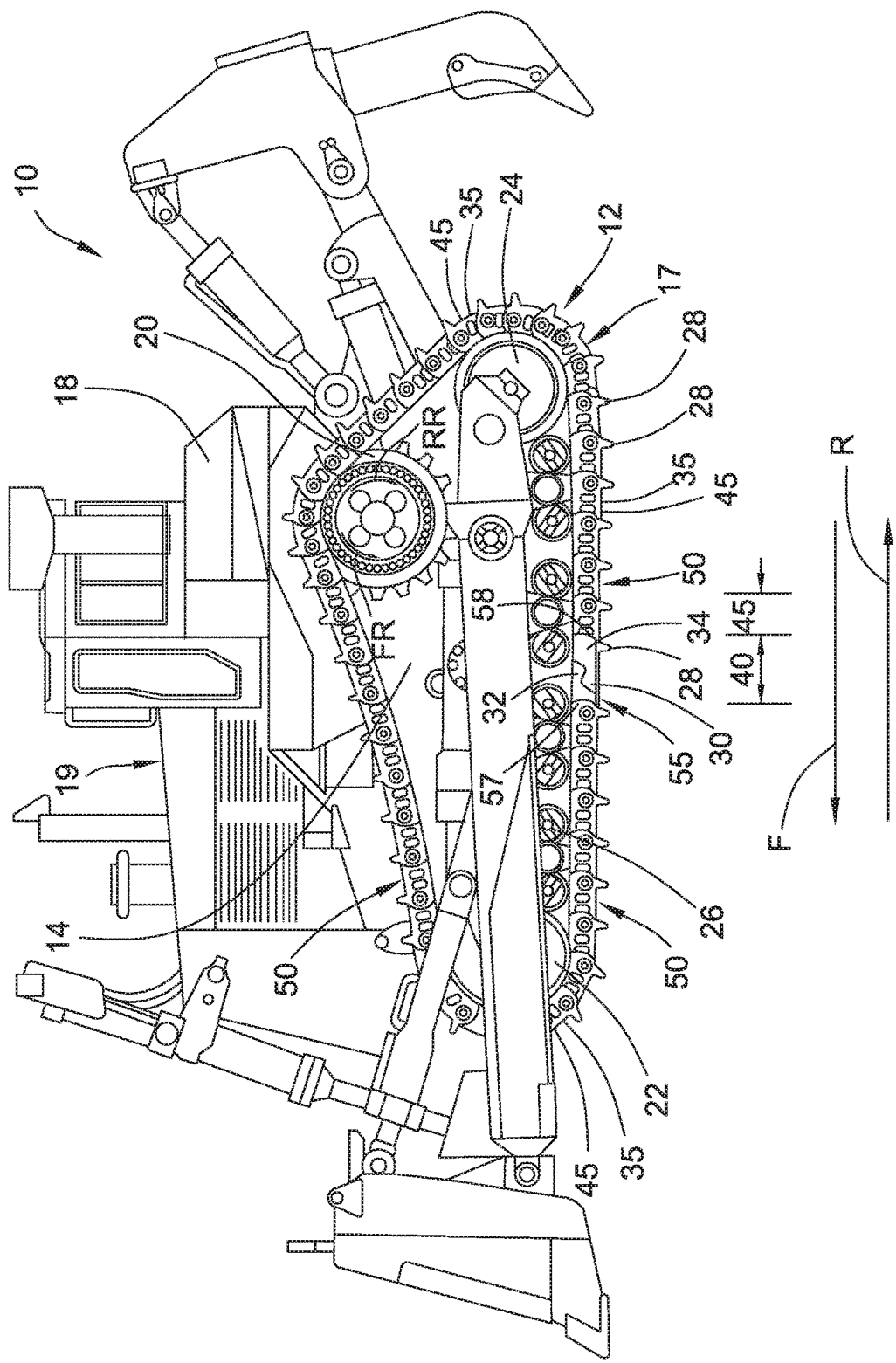
FIG. 1 is a diagrammatic side elevational view of an embodiment of a track-type machine which includes an undercarriage constructed in accordance with principles of the present disclosure.

Turning now to the Figures, there is shown in FIG. 1 an exemplary embodiment of a machine 10 with a track-type undercarriage 12. The machine 10 may also be referenced herein as a track-type machine. In other embodiments, the machine 10 may be any suitable machine with a track-type undercarriage, such as, a dozer, loader, excavator, or any other on-highway or off-highway vehicle, for example.

The machine 10 includes a frame 14 having a first track chain assembly 17 disposed on a first side 18 thereof and which is constructed according to principles of the present disclosure, and a second track chain assembly (not shown) disposed on a second side 19 thereof. The second side 19 is in opposing relationship to the first side 18. Together, the track assemblies are adapted to engage the ground, or other surface, to propel the machine 10.

It should be appreciated that the track assemblies of the machine 10 may be similar and, further, may represent mirror images of one another. As such, only the first track chain assembly 17 will be described herein. It should be understood that the description of the first track chain assembly 17 is applicable to the second track chain assembly, as well.

The first track chain assembly 17 extends about a plurality of rolling elements such as a drive sprocket 20, a front idler 22, a rear idler 24, and a plurality of track rollers 26. The track chain assembly 17 includes a plurality of ground-engaging track shoes 28 for engaging the ground (only a few of which being specifically identified in FIG. 1), or other surface, and propelling the machine 10.

The track chain assembly also includes a master link 30 constructed according to principles of the present disclosure and a plurality of standard links 35 (only a few of which being specifically identified in FIG. 1). In embodiments, the master link 30 is configured to enable relatively simple disassembly of the track chain assembly 17 (e.g., to service the track chain assembly 17 or other components of the machine 10) and to provide robust service life. The master link 30 includes a first master link portion 32 and a second master link portion 34 which are mated together to define the master link 30. The master link 30 also has a track shoe 28 connected thereto.

In embodiments, the master link 30 can have a master link pitch 40 (the pitch of the link is the distance between its pin passages) that is greater than a standard link pitch 45 of the standard links 35 of the first chain assembly 17. In the illustrated embodiment, the master link pitch 40 is equal to twice the standard link pitch 45. In other embodiments, the master link pitch 40 is equal to one and one half of the standard link pitch 45.

In the embodiment of FIG. 1, the standard links 35 and the master link 30 comprise offset links, as will be readily understood by one skilled in the art. The first track chain assembly 17 can include dual sets of coupled together links 35 extending about the rolling elements that are mirror images of each other. Each of the sets of links 35 can have a master link 30 constructed according to principles of the present disclosure, such as the master link 30 shown in FIG. 1, included therein.

As such, the first chain assembly 17 comprises a series of links 35, 30 that includes a plurality of link subassemblies 50 (only a few of which being specifically identified in FIG. 1) and a master link subassembly 55. Each of the plurality of link subassemblies 50 is connected to an adjacent link subassembly 50 such that the plurality of link subassemblies 50 has a first end 57 and a second end 58. The master link subassembly 55 is connected to the first end 57 and the second end 58 of the plurality of link subassemblies 50.

The drive sprocket 20 is rotatably mounted with respect to the frame 14. The track chain assembly 17 is enmeshed with the drive sprocket 20. During typical operation of the undercarriage 12, the drive sprocket 20 is driven in a forward rotational direction FR to drive the track chain assembly 17, and thus the machine 10, in a forward direction F, and in a reverse rotational direction RR to drive the track chain assembly 17, and thus the machine 10, in a reverse direction R. The drive sprockets 20 of the undercarriage 12 can be independently operated to turn the machine 10.

While the machine 10 is illustrated in the context of a track-type machine, it should be appreciated that the present disclosure is not thereby limited, and that a wide variety of other machines having tracks are also contemplated within the present context. For example, in other embodiments, the track chain assembly 17 can be included in a conveyor system, as a track for transmitting torque between rotating elements, or in any other application known to those skilled in the art.

Embodiments of a track chain assembly following principles of the present disclosure can include any of a variety of different link configurations known to those skilled in the art. For example, referring now to FIG. 2, an embodiment of a track chain assembly 77 (only a portion of which is shown) constructed according to principles of the present disclosure includes a plurality of link subassemblies 80 and a master link subassembly 85. In embodiments, each of the link subassemblies 80 of the track chain assembly 77 includes at least one standard link 90, 91 with a standard link pitch 95, and the master link subassembly 85 includes at least one master link 100 with a master link pitch 105 that is greater than the standard link pitch 95. FIG. 3 shows a fragmentary, diagrammatic side elevational view of the track chain assembly 17 of FIG. 1, and it will be used as further reference in discussing corresponding structure in both track chain assemblies 77, 17.

Each of the link subassemblies 80 is connected to an adjacent link subassembly 80 so that, when an appropriate number of the link subassemblies 80 are connected together, the track chain assembly 77 is formed. The track chain assembly 77 has a predetermined length suitable for its intended purpose in a given application to form a closed loop via the master link subassembly 85. The master link subassembly 85 is connected to a first end 107 and a second end 108 of the interconnected link subassemblies 80 to form the closed loop.

In the illustrated embodiment, each link subassembly 80 includes one of a pair of inboard links 90 and a pair of outboard links 91; a pin assembly 125; and a track shoe 128 (see FIG. 3). The pin assembly 125 extends between the pair of links 90, 91. The track shoe 128 is connected to the respective inboard and outboard links 90, 91.

In the illustrated embodiment, the master link subassembly 85 includes a pair of master links 100, 100', a pin assembly 130, and a track shoe 138. The pin assembly 130 extends between the pair of master links 100, 100', which are positioned to be mirror images of each other. The track shoe 138 is connected to the master links 100, 100'.

In embodiments, the pin assembly 130 of the master link subassembly 85 can have substantially the same construction as the pin assembly 125 of the standard link subassemblies 80. In embodiments, the track shoe 138 of the master link subassembly 85 can be configured to fit within the gap defined between the first end 107 and the second end 108 of the connected standard link subassemblies 80 when the master links 100 are connected thereto (see FIG. 3). In embodiments, other than its length, the track shoe 138 of the master link subassembly 85 can be similar in other respects to the track shoes 128 of the standard link subassemblies 80.

The closed loop is formed by mechanically coupling the first end 107 and the second end 108 together via the master link assembly 85 to respectively provide a first loop 131 of a series of alternately arranged inboard and outboard links 90, 91 and a second loop 132 of a series of alternately arranged inboard and outboard links 90, 91 coupled together via the pin assemblies 125, 130.

The inboard links 90 and the outboard links 91 of the standard link subassemblies 80 are mirror images of each other. Accordingly, it should be understood that the description of one link 90 is generally applicable to the other link 91, as well. The inboard links 90, the outboard links 91, and the master links 100, 100' can be made from any suitable material, such as, metal, for example.

Figure 2:
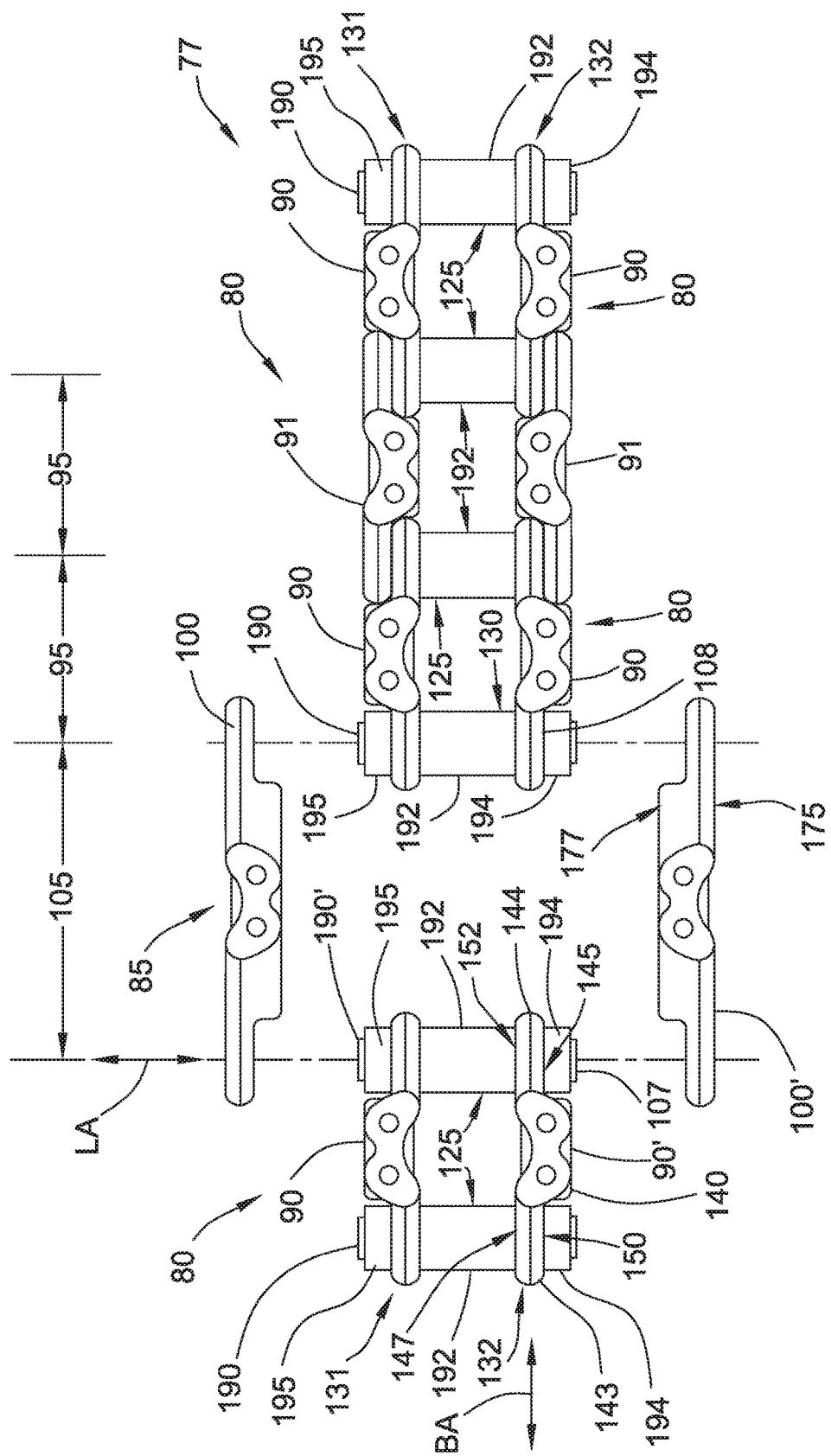
FIG. 2 is a fragmentary, diagrammatic top plan view of an embodiment of a track chain assembly constructed in accordance with principles of the present disclosure which is suitable for use in the machine of FIG. 1.
Figure 3:
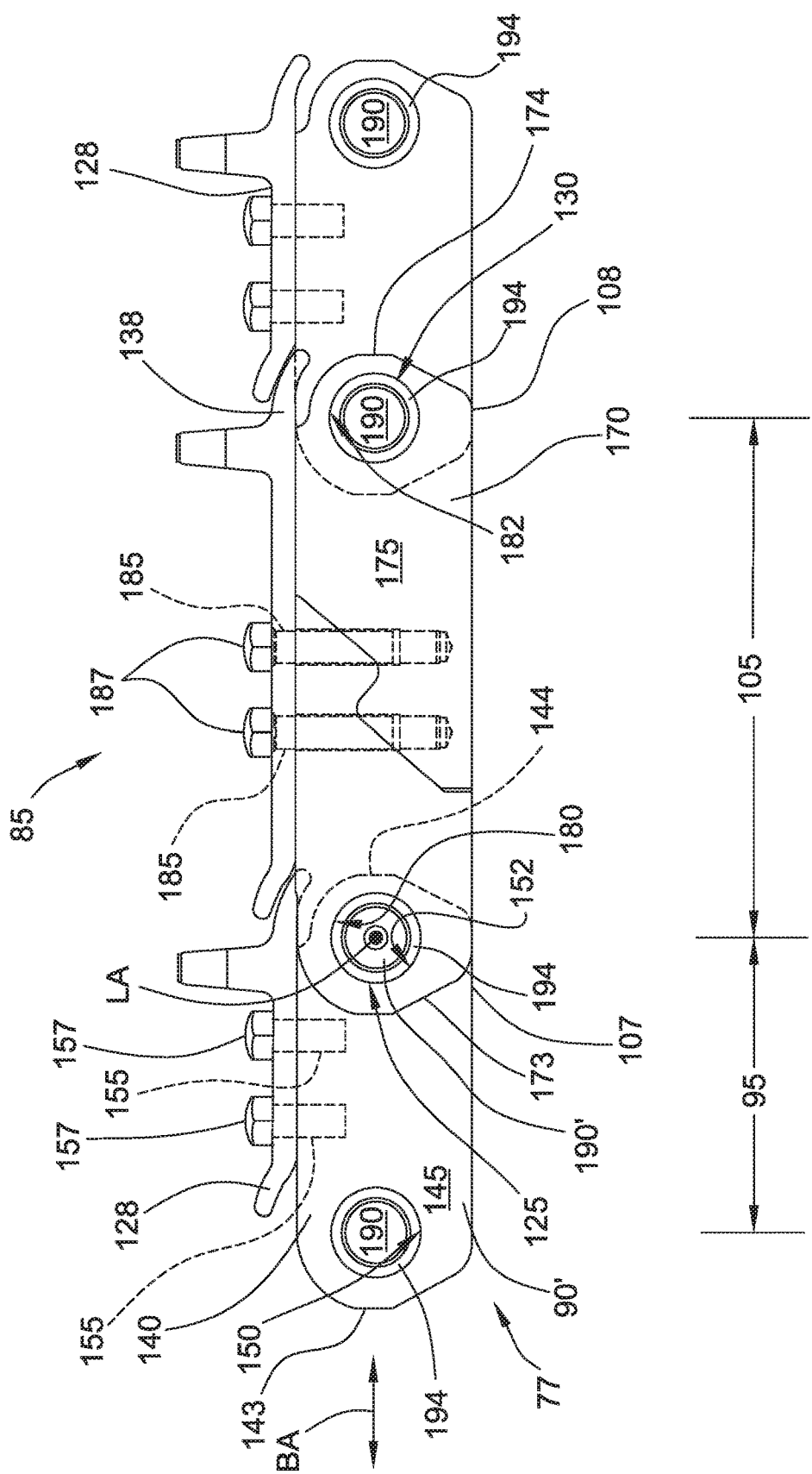
FIG. 3 is a fragmentary, diagrammatic side elevational view of the track chain assembly of FIG. 1.

As shown in FIGS. 2 and 3 with respect to the inboard link 90', the inboard link 90 and the outboard link 91 each includes a body 140 having a first end 143, a second end 144, an outer sidewall 145 and an inner sidewall 147. The outer sidewall 145 and the inner sidewall 147 extend along a body axis BA between the first end 143 and the second end 144.

Each link 90, 91 defines a pair of pin passages 150, 152 in spaced relationship to each other by the standard link pitch 95. The first end 143 and the second end 144 define a first pin passage 150 and a second pin passage 152, respectively. Each of the first pin passage 150 and the second pin passage 152 extends between the outer sidewall 145 and the inner sidewall 147. The pin passages 150, 152 of both the inboard links 90 and the outboard links 91 can be configured to receive therethrough at least a portion of one of the pin assemblies 125, 130.

The bodies 140 of each of the inboard and the outboard links 90, 91 can define fastener passages 155, which can include an internal threaded surface configured to threadingly receive a fastener 157, e.g., a bolt, therein to attach the track shoe 128 to a given one of the standard link subassemblies 80.

The master links 100, 100' of the master link subassembly 85 have the same construction. Accordingly, only one of the master links 100' will be described. It should be understood that the description of the one master link 100' is applicable to the other master link 100, as well.

The master link 100' includes a body 170 having a first end 173, a second end 174, an outer sidewall 175 and an inner sidewall 177. The outer sidewall 175 and the inner sidewall 177 extend along a body axis BA between the first end 173 and the second end 174. The master link 100' defines a pair of master link pin passages 180, 182 in spaced relationship to each other by the master link pitch 105.

In embodiments, the master link pitch 105 is greater than the standard link pitch 95 in a range up to twice the standard link pitch 95. In embodiments, the master link pitch 105 is equal to one and one half of the standard link pitch 95 (master link pitch=1.5×standard link pitch). In embodiments, the master link pitch 105 is equal to twice the standard link pitch 95 (master link pitch=two×standard link pitch).

The body 170 of the master link 100' can define fastener passages 185, which can include an internal threaded surface configured to threadingly receive a fastener 187, e.g., a bolt, therein to attach the track shoe 138 to the master links 100, 100' of the master link subassembly 85. Each master link 100, 100' can be similar in other respects to the standard links 91.

Adjacent link subassemblies 80, 85 can be interconnected by way of the pin assemblies 125, 130. The pin assemblies 125, 130 are configured to interface with the inboard and outboard links 90, 91 and the master links 100 such that consecutively connected link subassemblies 80, 85 are pivotally interconnected to one another to form the track chain assembly 77.

In the illustrated embodiment, the pin assembly 125 of the standard link subassemblies 80 and the pin assembly 130 of the master link subassembly 85 are substantially the same. Each pin assembly 125, 130 includes a track pin 190, a bushing 192, a pair of bearings (not shown), and a pair of collars 194, 195. Each track pin 190 (only one of which 190' is shown) defines a longitudinal axis LA. The bushing 192 is positioned coaxially around the track pin 190 and is rotatable about the longitudinal axis LA relative to the track pin 190. The collars 194, 195 are disposed at a respective end of the track pin 190 and are fixed relative to the track pin 190. The bushing 192 can be disposed substantially at the midline of the track pin 190 along the longitudinal axis LA thereof, and each one of the pair of bearings may be interposed between a respective one of the collars 194, 195 and the bushing 192.

In embodiments, each link 90, 91 is mounted to the respective track pin 190 such that the track pin 190 extends through one of the pair of pin passages 150, 152. For example, in embodiments, the inboard link 90 can be configured to engage the bearings which are disposed within the first and second pin passages 150, 152. The bearings are pivotally movable with respect to the track pin 190 about the longitudinal axis LA such that the inboard links 90 are pivotable with respect to the track pin 190. The outboard links 91 can be configured to respectively engage the collars 194, 195, which are fixed with respect to the track pin 190 and are respectively disposed within one of the first and second pin passages 150, 152 of the outboard links 91. As such, adjacent link subassemblies 80, i.e., including a pair of inboard links 90 and a pair of outboard links 91, respectively, can be configured to pivot with respect to one another to form an articulating track chain assembly 77.

In each of the subassemblies 80, the bearings and the collars 194, 195 can be secured to the respective inboard and outboard links 90, 91 by way of press-fits. Specifically, the bearings can be press-fit into one of the pin passages 150, 152 of the inboard links 90 on one link subassembly 80, and the collars 194, 195 can be press-fit into one of the pin passages 150, 152 of the outboard links 91 of the adjacent link subassembly 80. In embodiments, any suitable technique for securing the components together can be used, such as, by using welds, snap rings, or other mechanisms known in the art.

The master link subassembly 85 can be interconnected with the pin assemblies 130, 125 in a similar manner. For example, referring to FIG. 3, the master link 100' is mounted to the track pin 190' such that the track pin 190' extends through the first master link pin passage 180 of the pair of master link pin passages 180, 182 and such that the link 90' and the master link 100' are rotatable with respect to each other about the longitudinal axis LA of the track pin 190'.

In embodiments, the track pin 190 can have any suitable configuration. For example, in embodiments, the track pin 190 can include an inner surface that defines a cylindrical bore extending therethrough along the longitudinal axis LA and concentrically disposed about the longitudinal axis LA and at least one cross bore that extends from the outer surface thereof inwardly to the bore in a direction perpendicular to the central longitudinal axis LA for distributing lubricant stored in the central bore of the pin.

In embodiments, the bushing 192 is positioned coaxially around the track pin 190 and is configured to engage the drive sprocket 20 that propels the track chain assembly 77. The bushing 192 can rotate about the longitudinal axis LA relative to the track pin 190 when it engages the drive sprocket 20. In embodiments, a lubricant can be deposited between the bushing 192 and the track pin 190.

In the illustrated embodiment, the bushing 192 is substantially cylindrical. In other embodiments, one or more different bushings can be used in the track chain assembly 77. For example, in embodiments, the outer surface of the bushing 192 can define a lobed surface, such as is shown and described in U.S. Patent Application Publication No. 2010/0139993 for a "Lobed Bushing For Track Assembly and Track-Type Machine Using Same," which is incorporated by reference in its entirety herein by this reference. In yet other embodiments, the bushing 192 can have a different shape and configuration as known in the art. In yet other embodiments, the track chain assembly 77 can include subassemblies each with an inner and an outer bushing as known in the art.

In embodiments, the components of at least one of the link subassemblies 80 and the master link subassembly 85 can define at least one annular seal groove or cavity that is concentrically disposed about the longitudinal axis LA of the respective track pin 190. Each seal cavity can be adapted to house therein a seal assembly suitable for sealingly engaging relatively rotatable components of the particular subassembly, as will be readily appreciated by one skilled in the art.

In other embodiments, the links of the track chain assembly can have yet a different configuration, as one skilled in the art would recognize. For example, in embodiments, the links can comprise offset links. For example, in embodiments, inwardly offset ends of each link can be fixedly connected to a bushing, which can be at least partially disposed within the pin passage defined within the inwardly offset end of the link. Similarly, outwardly offset ends of each link can be secured to the track pin (such as via, a collar), which can be at least partially positioned within a second pin passage defined within the outwardly offset end of the link of the adjacent link subassembly. Accordingly, the inwardly offset ends mounted to the respective bushings can pivot relative to the outwardly offset ends respectively mounted to the track pins as the track chain assembly rotates over a rolling element, such as the drive sprocket.

Figure 4:
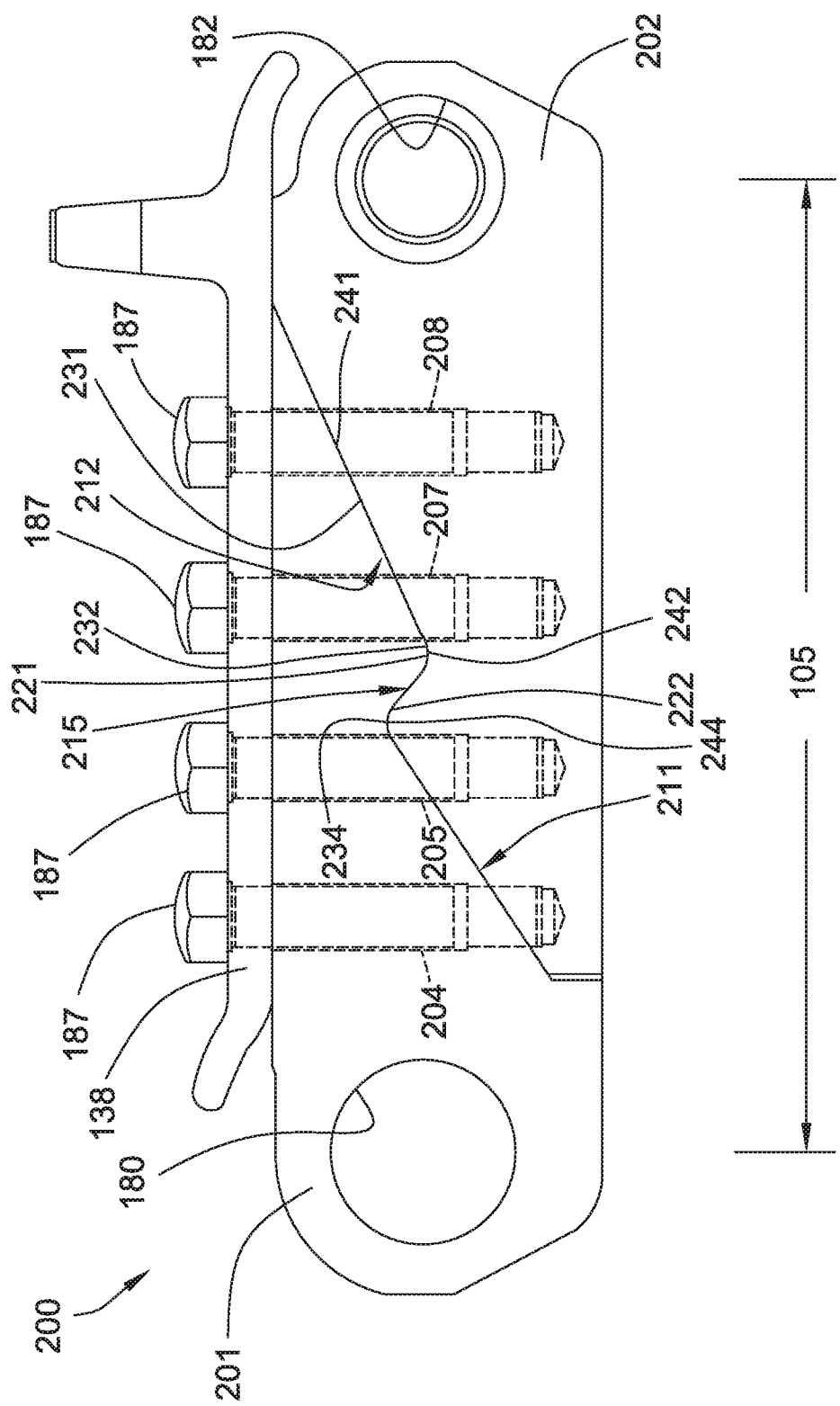
FIG. 4 is a diagrammatic side elevational view of an embodiment of a master link constructed in accordance with principles of the present disclosure.

Referring to FIG. 4, in embodiments, a master link 200 constructed according to principles of the present disclosure can be of the type generally known in the art as a single tooth master link. In embodiments, the master link 200 can be used in the track chain assembly 77 shown in FIGS. 2 and 3. The master link 200 includes a first master link portion 201 and a second master link portion 202. Each of the first master link portion 201 and the second master link portion 202 can be configured to couple with a separate inboard link 90 of the track chain assembly 77. The track shoe 138 can be connected to the first master link portion 201 and the second master link portion 202 via a plurality of fasteners 187, respectively threadingly engaged with a corresponding plurality of fastener passages 204, 205, 207, 208 defined within the master link 200 when the first and second master link portions 201, 202 are mated together. The fasteners 187 can also help interconnect the first and second master link portions 201, 202.

In embodiments, the first master link portion 201 defines one of the pair of master link pin passages 180, 182, and the second master link portion 202 defines the other of the pair of master link pin passages 180, 182. In the illustrated embodiment, the first master link portion 201 defines the first master link pin passage 180, and the second master link portion 202 defines the second master link pin passage 182. In embodiments, the first and second master link pin passages 180, 182 of the master link 200 are in spaced relationship to each other by a master link pitch 105, which is in a range up to twice the standard link pitch 95 of the stand link assemblies 80 of the track chain assembly 77. In embodiments, the master link pitch 105 is equal to one and one half of the standard link pitch 95 (master link pitch=1.5× standard link pitch). In embodiments, the master link pitch 105 is equal to twice the standard link pitch 95 (master link pitch=two×standard link pitch).

In embodiments, the master link 200 can define more than two fastener passages therein to help promote the interconnection between the first and second master link portions 201, 202. Extending the master link pitch 105 relative to the standard link pitch 95 can help permit the master link 200 to define more than two fastener passages therein while maintaining sufficient spacing therebetween so that the structural rigidity of the master link 200 is not negatively affected by the presence of the additional fastener passage(s). In the illustrated embodiment, the first and second master link portions 201, 202 define four fastener passages 204, 205, 207, 208. In embodiments, the increased number of fasteners 187 used to interconnect the first and second master link portions 201, 202 can help promote the robustness of their interconnection and help extend the useful life of the master link 200. In other embodiments, the master link 200 can have a different number of fastener passages defined therein. In embodiments, the master link pitch 105 can be adjusted such that the master link can define therein a desired number of fastener passages that are sufficiently spaced apart from each other to promote the structural integrity of the body of the master link 200 when it is assembled via the fasteners.

The first master link portion 201 includes a first profiled surface 211, and the second master link portion 202 includes a second profiled surface 212 which has a complementary configuration relative to the first profiled surface 211. The second profiled surface 212 is in contacting relationship with the first profiled surface 211 such that a mating interface 215 of the first master link portion 201 and the second master link portion 202 is defined therebetween.

In the illustrated embodiment, the first profiled surface 211 and the second profiled surface 212 include a first tooth segment 221 and a second tooth segment 222, respectively. The first tooth segment 221 and the second tooth segment 222 are in contacting relationship with each other to interengage the first master link portion 201 and the second master link portion 202. The illustrated first profiled surface 211 includes a slope portion 231, a convex portion 232, and a concave portion 234. The convex portion 232 is adjacent the slope portion 231 and includes the first tooth segment 221. The concave portion 234 is adjacent the convex portion 232 such that the convex portion 232 is interposed between the slope portion 231 and the concave portion 234.

The illustrated second profile surface 212 has a complementary configuration that includes a complementary slope portion 241, a complementary concave portion 242, and a complementary convex portion 244. The complementary concave portion 242 is adjacent the complementary slope portion 241. The complementary convex portion 244 is adjacent the complementary concave portion 242 such that the complementary concave portion 242 is interposed between the complementary slope portion 241 and the complementary convex portion 244. The complementary convex portion 244 includes the second tooth segment 222.

In embodiments, a master link constructed according to principles of the present disclosure can have first and second master link portions with different configurations. For example, in embodiments, the master link portions can include a plurality of complementary interengaging tooth segments (such as in a saw tooth arrangement). In other embodiments, the location of the fastener passages 205, 207 (and their relative relationship) can be varied. In yet other embodiments, the size and construction of the track shoe 138 can be different.

Figure 5:
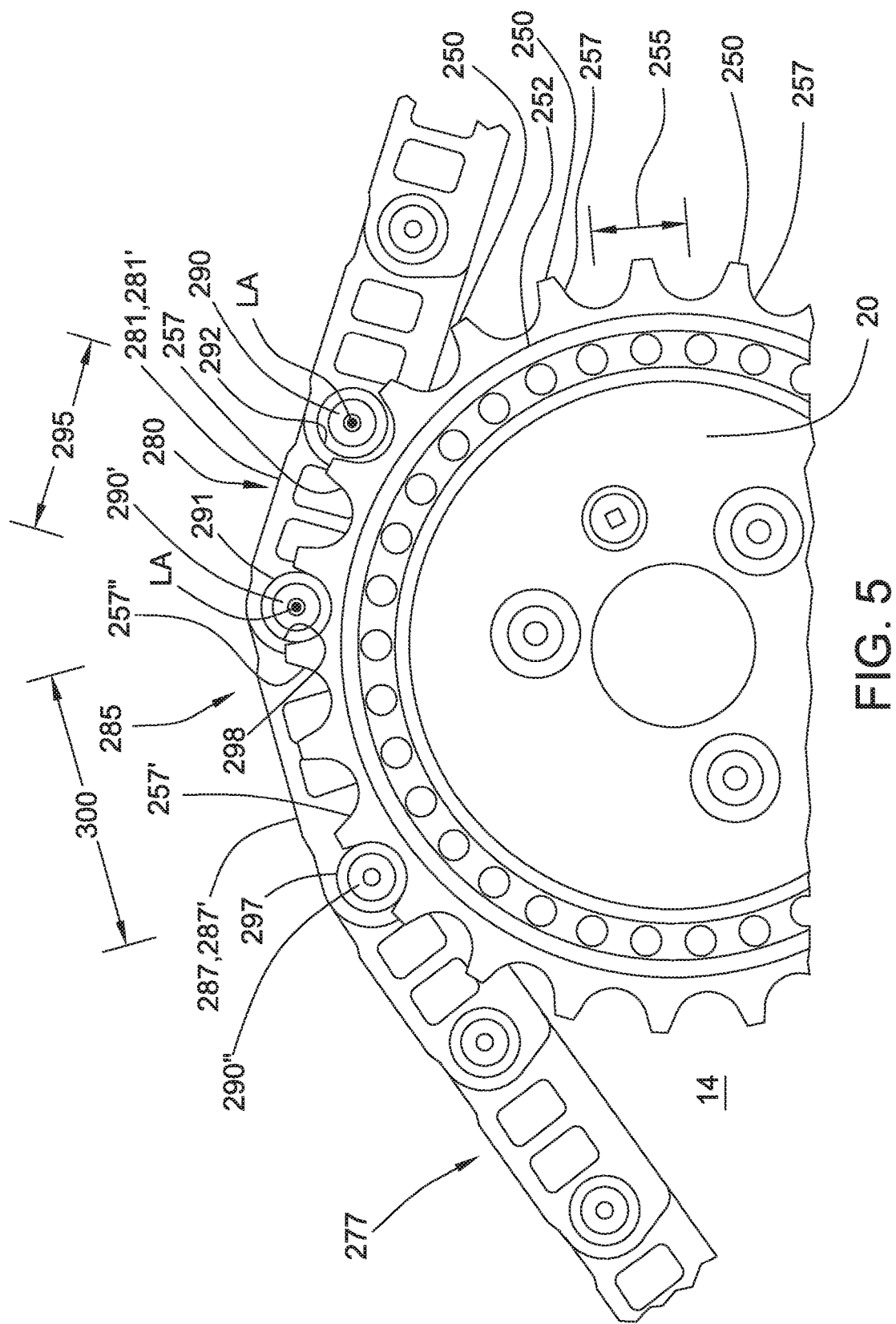
FIG. 5 is a fragmentary, diagrammatic side elevational view of an embodiment of a track chain assembly constructed in accordance with principles of the present disclosure that is enmeshed with a drive sprocket, both of which being suitable for use in the machine of FIG. 1.

Referring to FIG. 5, the drive sprocket 20 is rotatably mounted with respect to the frame 14. The drive sprocket 20 includes a plurality of sprocket teeth 250. The plurality of sprocket teeth 250 are in uniform spaced relationship to each other about a circumference 252 of the drive sprocket 20 by a sprocket tooth pitch 255. Adjacent sprocket teeth 250 define a pin recess 257 therebetween.

A track chain assembly 277 constructed according to principles of the present disclosure is enmeshed with the drive sprocket 20. In embodiments, the track chain assembly 277 can include a first link subassembly 280 having a first link 281 and a second link subassembly 285 having a second link 287. Each of the first and second link subassemblies 280, 285 includes a track pin 290, 290'. Each track pin 290 defines a longitudinal axis LA. The first link 281 defines a first pair of pin passages 291, 292 in spaced relationship to each other by a first link pitch 295. The first link 281 is mounted to the track pin 290' such that the track pin 290' extends through one 291 of the first pair of pin passages 291, 292. The second link 287 defines a second pair of pin passages 297, 298 in spaced relationship to each other by a second link pitch 300. The second link 287 is mounted to the track pin 290' such that the track pin 290' extends through one 298 of the second pair of pin passages 297, 298 and such that the first link 281 and the second link 287 are rotatable with respect to each other about the longitudinal axis LA of the track pin 290'.

In embodiments, the second link pitch 300 is greater than the first link pitch 295 in a range up to twice the first link pitch 295. In embodiments, the second link pitch 300 is equal to one and one half of the first link pitch 295 (second link pitch=1.5×first link pitch). In embodiments, the second link pitch 300 is equal to twice the first link pitch 295 (second link pitch=two×first link pitch).

It should be understood that, in the illustrated embodiment, the first and second link subassemblies 280, 285 each includes a pair of first links 281, 281' and a pair of second links 287, 287', respectively, in spaced relationship to each other along the respective track pin 290, 290' as discussed above. In the illustrated embodiment, both the first link 281 and the second link 287 comprise offset links having similar construction except that the second link 287 is elongated relative to the first link 281. The pairs of first links 281 and second links 287 present in each respective subassembly 280, 285 can be respective mirror images of each other. In other embodiments, the first link 281 and the second link 287 can comprise other types of links (such as a straight link, for example), and in embodiments, the second link 287 can comprise a master link as discussed above.

In embodiments, a track chain assembly constructed according to principles of the present disclosure can include a plurality of first link subassemblies 280 and at least one second link assembly 285. For example, in embodiments, a track chain assembly constructed according to principles of the present disclosure can include a plurality of first link subassemblies 280 and a plurality of second link assemblies 285. In embodiments, the second link subassemblies 285 can be in spaced relationship to each other such that at least one first link subassembly 280 is interposed between adjacent second link subassemblies 285.

In embodiments, the first link pitch 295 and the second link pitch 300 are both an integer multiple of the sprocket tooth pitch 255. In the illustrated embodiment, the first link pitch 295 is twice the sprocket tooth pitch 255 such that track pins 290, 290' associated with adjacent first link subassemblies 280 are disposed in every other pin recess 257. In the illustrated embodiment, the second link pitch 300 is three times the sprocket tooth pitch 255 such that the track pins 290', 290'' associated with the second links 287, 287' of the second link subassembly 285 are disposed in pin recesses 257 with two empty pin recesses 257', 257'' interposed therebetween. In other embodiments, the relative configuration of the drive sprocket 20 and the track pins 290, 290' of each first link subassembly 280 and the track pins 290', 290'' associated with each second link subassembly 85 can be varied.

In other embodiments, a track chain assembly according to principles of the present disclosure can include other components and have different arrangements. For example, in other embodiments the track chain assembly can include a pin cartridge assembly with sleeve bearings and other components as shown and described in U.S. Patent Application Publication No. 2006/0284485, which is incorporated in its entirety herein by this reference.

It should be recognized that the terms such as "inner," "outer," "inboard," "outboard," "standard," and "master" in reference to the links and other components of each track chain assembly in the exemplary embodiments described herein are used merely as convenient labels to facilitate the understanding of one skilled in the art and are not meant to be limiting in any way. Other terms, such as, "left" and "right" and/or "first" and "second," could be interchangeably used as well and the selection of one such identifying label over another should not be construed to be limiting in any way.

INDUSTRIAL APPLICABILITY

The industrial applicability of the embodiments of a track chain assembly and a master link described herein will be readily appreciated from the foregoing discussion. At least one embodiment of the disclosed master links can be used for a track chain assembly. At least one embodiment of the disclosed track chain assemblies can be used in an undercarriage of a track-type machine. An exemplary embodiment of a track chain assembly includes a plurality of links, each having a standard link pitch, and at least one link having an increased link pitch that is greater than the standard link pitch.

In embodiments, the increased link pitch can be one and a half of the standard link pitch, and an associated sprocket can have a sprocket tooth pitch configured such that the standard link pitch is nominally twice the sprocket tooth pitch and the increased link pitch is nominally three times the sprocket tooth pitch. In embodiments where a link with the increased link pitch comprises a master link, the master link can be configured such that the assembly of track chain in the undercarriage is made easier for the operator, the master link has a more robust construction, and the master link substantially avoids producing second or third order excitations that can be produced when using a number of longer links.

Embodiments of a link and a track chain assembly according to principles of the present disclosure may find potential application in any machine, such as a track-type tractor, which utilizes a track-type undercarriage. Yet further, the present disclosure may be applicable to track chain assemblies in which the components are subject to significant wear. Such machines may include, but are not limited to, dozers, loaders, excavators, or any other on-highway or off-highway vehicles or stationary machines that utilize a track assembly, as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A track chain assembly comprising:

a plurality of link subassemblies, each of the plurality of link subassemblies being connected to an adjacent link subassembly such that the plurality of link subassemblies has a first end and a second end, each of the plurality of link subassemblies including a link, the link defining a pair of pin passages in spaced relationship to each other by a standard link pitch; and a master link subassembly, the master link subassembly connected to the first end and the second end of the plurality of link subassemblies, the master link subassembly including a master link, the master link defining a pair of master link pin passages in spaced relationship to each other by a master link pitch, wherein the master link pitch is greater than the standard link pitch in a range up to twice the standard link pitch, wherein the master link includes a first master link portion and a second master link portion, the first master link portion defining one of the pair of master link pin passages, the first master link portion including a first profiled surface, the second master link portion defining the other of the pair of master link pin passages, the second master link portion including a second profiled surface, the second profiled surface having a complementary configuration relative to the first profiled surface and being in contacting relationship with the first profiled surface such that a mating interface of the first master link portion and the second master link portion is defined therebetween.

2. The track chain assembly of claim 1, wherein the master link pitch is equal to one and one half of the standard link pitch.

3. The track chain assembly of claim 1, wherein the master link pitch is equal to twice the standard link pitch.

4. The track chain assembly of claim 1, wherein the first profiled surface and the second profiled surface includes a first tooth segment and a second tooth segment, respectively, the first tooth segment and the second tooth segment being in contacting relationship with each other to interengage the first master link portion and the second master link portion.

5. The track chain assembly of claim 1, wherein the first profiled surface includes a slope portion, a convex portion, and a concave portion, the convex portion being adjacent the slope portion and including a tooth segment, and the concave portion being adjacent the convex portion such that the convex portion is interposed between the slope portion and the concave portion.

6. The track chain assembly of claim 1, wherein the first master link portion and second master link portion each include a plurality of complementary interengaging tooth segments.

7. A machine comprising:
a frame;
a drive sprocket, the drive sprocket rotatably mounted with respect to the frame;
a track chain assembly, the track chain assembly being enmeshed with the drive sprocket, the track chain assembly including:
 a plurality of link subassemblies, each of the plurality of link subassemblies being connected to an adjacent link subassembly such that the plurality of link subassemblies has a first end and a second end, each of the plurality of link subassemblies including a link, the link defining a pair of pin passages in spaced relationship to each other by a standard link pitch, and
 a master link subassembly, the master link subassembly connected to the first end and the second end of the plurality of link subassemblies, the master link subassembly including a master link, the master link defining a pair of master link pin passages in spaced relationship to each other by a master link pitch, wherein the master link pitch is greater than the standard link pitch in a range up to twice the standard link pitch, wherein the master link includes a first master link portion and a second master link portion, the first master link portion defining one of the pair of master link pin passages, the first master link portion including a first profiled surface, the second master link portion defining the other of the pair of master link pin passages, the second master link portion including a second profiled surface, the second profiled surface having a complementary configuration relative to the first profiled surface and being in contacting relationship with the first profiled surface such that a mating interface of the first master link portion and the second master link portion is defined therebetween.

8. The machine of claim 7, wherein the master link pitch is equal to one and one half of the standard link pitch.

9. The machine of claim 7, wherein the master link pitch is twice the standard link pitch.

10. The machine of claim 7, wherein the drive sprocket includes a plurality of sprocket teeth, the plurality of sprocket teeth being in uniform spaced relationship to each other about a circumference of the drive sprocket by a sprocket tooth pitch, and wherein the standard link pitch and the master link pitch are both an integer multiple of the sprocket tooth pitch.

11. The machine of claim 10, wherein the standard link pitch is twice the sprocket tooth pitch, and the master link pitch is three times the sprocket tooth pitch.

12. The machine of claim 7, wherein the first profiled surface and the second profiled surface includes a first tooth segment and a second tooth segment, respectively, the first tooth segment and the second tooth segment being in contacting relationship with each other to interengage the first master link portion and the second master link portion.

13. The machine of claim 7, wherein the first profiled surface includes a slope portion, a convex portion, and a concave portion, the convex portion being adjacent the slope portion and including a tooth segment, and the concave portion being adjacent the convex portion such that the convex portion is interposed between the slope portion and the concave portion.

14. The machine of claim 7, wherein the master link subassembly includes a track shoe and a pair of fasteners, the track shoe being connected to the first master link portion and the second master link portion via the pair of fasteners, respectively.

15. A track chain assembly comprising:
a track pin defining a longitudinal axis;
a first link, the first link defining a first pair of pin passages in spaced relationship to each other by a first link pitch, the first link mounted to the track pin such that the track pin extends through one of the first pair of pin passages; and
a second link, the second link defining a second pair of pin passages in spaced relationship to each other by a second link pitch, the second link mounted to the track pin such that the track pin extends through one of the second pair of pin passages and such that the first link and the second link are rotatable with respect to each other about the longitudinal axis of the track pin, wherein the second link pitch is greater than the first link pitch in a range up to twice the first link pitch, wherein the second link comprises a master link, and the master link includes a first master link portion and a second master link portion, the first master link portion defining one of the second pair of pin passages, the first master link portion including a first profiled surface, the second master link portion defining the other of the second pair of pin passages, the second master link portion including a second profiled surface, the second profiled surface having a complementary configuration relative to the first profiled surface and being in contacting relationship with the first profiled surface such that a mating interface of the first master link portion and the second master link portion is defined therebetween.

16. The track chain assembly of claim 15, wherein the second link pitch is equal to one and one half of the first link pitch.

17. The track chain assembly of claim 15, wherein the second link pitch is equal to twice the first link pitch.

* * * * *